US009328957B1

(12) United States Patent
Feinstein (10) Patent No.: US 9,328,957 B1
(45) Date of Patent: May 3, 2016

(54) SIDEWALK ACCESSIBLE FOOD SERVICE STAND

(71) Applicant: Darin Feinstein, Las Vegas, NV (US)

(72) Inventor: Darin Feinstein, Las Vegas, NV (US)

( * ) Notice: Subject to any disclaimer, the term of this patent is extended or adjusted under 35 U.S.C. 154(b) by 0 days.

(21) Appl. No.: 14/290,824

(22) Filed: May 29, 2014

(51) Int. Cl.
*F25D 31/00* (2006.01)
*F25D 23/00* (2006.01)
*B60P 3/025* (2006.01)

(52) U.S. Cl.
CPC .............. *F25D 31/002* (2013.01); *F25D 23/00* (2013.01); *B60P 3/0257* (2013.01)

(58) Field of Classification Search
CPC ........ B60P 3/007; B60P 3/025; B60P 3/0257; B60P 3/05; B60P 3/20; B60P 3/205; E04B 2002/7483; E04H 1/125
USPC .......................... 296/22, 24.36; 52/36.1, 36.2
See application file for complete search history.

(56) References Cited

U.S. PATENT DOCUMENTS

| | | | | |
|---|---|---|---|---|
| 1,474,864 A * | 11/1923 | Vogt et al. | ........................ | 52/36.2 |
| 1,964,805 A * | 7/1934 | Barnes | ........................... | 126/268 |
| 2,982,578 A * | 5/1961 | Lowe | ................................ | 296/22 |
| 3,073,646 A * | 1/1963 | Garrison, Sr. | .................... | 296/22 |
| 3,667,799 A * | 6/1972 | Shryock | ........................ | 296/168 |
| 3,705,743 A * | 12/1972 | Toomey | ........................ | 296/168 |
| 3,778,099 A * | 12/1973 | Rogove et al. | .................. | 296/21 |
| 3,807,788 A * | 4/1974 | Radek | ......................... | 296/24.44 |
| 3,949,902 A * | 4/1976 | Thompson | .................. | 222/129.1 |
| 4,601,509 A * | 7/1986 | Ellis, Sr. | .......................... | 296/22 |
| 4,666,204 A * | 5/1987 | Reinholtz | ........................ | 296/22 |
| 4,667,580 A * | 5/1987 | Wetzel | ............................ | 454/187 |
| 4,919,477 A * | 4/1990 | Bingham et al. | ............ | 296/24.36 |
| 5,192,003 A | 3/1993 | Billings | | |
| 5,285,604 A * | 2/1994 | Carlin | ............................ | 52/79.1 |
| 5,692,392 A | 12/1997 | Swier | | |
| 6,189,944 B1 * | 2/2001 | Piche | ............................... | 296/22 |
| 6,415,555 B1 * | 7/2002 | Montague | ...................... | 52/36.2 |
| 6,431,628 B1 * | 8/2002 | Bell, Jr. | ....................... | 296/24.32 |
| 6,434,966 B1 | 8/2002 | Cunha | | |
| 6,460,580 B1 | 10/2002 | Cunha | | |
| D469,234 S | 1/2003 | Bond et al. | | |
| 6,745,592 B1 | 6/2004 | Edrington et al. | | |
| 7,052,062 B2 * | 5/2006 | Catt et al. | ......................... | 296/22 |
| 7,172,231 B1 * | 2/2007 | Johnson, II | ...................... | 296/22 |
| 7,591,140 B2 | 9/2009 | Franck et al. | | |
| 2008/0036238 A1* | 2/2008 | Weeda et al. | ............... | 296/146.1 |
| 2009/0078724 A1* | 3/2009 | Lamb et al. | .................... | 222/608 |
| 2010/0089378 A1* | 4/2010 | Babington et al. | ........... | 126/21 R |
| 2012/0325198 A1* | 12/2012 | Bacigalupo et al. | ........ | 126/19 M |
| 2013/0033057 A1* | 2/2013 | Markham | ........................ | 296/22 |
| 2013/0334833 A1* | 12/2013 | Karapetian, Jr. | ................ | 296/22 |

* cited by examiner

*Primary Examiner* — Elizabeth A Plummer
*Assistant Examiner* — Kyle Walraed-Sullivan
(74) *Attorney, Agent, or Firm* — Greenberg Traurig, LLP (57) ABSTRACT

A self-contained slushy stand built proximate to a sidewalk allowing customers passing by to order, pay and receive a slushy of their choosing. The stand comprises broadly (i) a service area including one or more cabinet units with countertops, sinks and refrigerated storage with the service area configured for employees to work therein; (ii) a walk-in storage unit rear of the service area with the storage unit configured to retain or support at least raw slushy product, one or more condenser units and slushy machines wherein the storage unit includes an access door permitting personnel to access one or more of said raw slushy product, condenser units and slushy machines; (iii) a payment receiving device; (iv) power source; and (iv) water source. The self-contained slushy stand may also include a canopy, speakers, cameras, misters, heaters and/or signage.

17 Claims, 11 Drawing Sheets

SIDEWALK ACCESSIBLE FOOD SERVICE STAND

FIELD OF THE INVENTION

The embodiments of the present invention relate to a self-contained food stand built proximate a sidewalk permitting passersby easy access to the food product being sold from the stand.

BACKGROUND

Catering to customers has never been more competitive. In heavy traffic areas like Las Vegas, New York and others it is difficult to attract passing individuals into a street side business. This is especially true for the food/restaurant industry.

It would be advantageous to develop a self-contained food stand built proximate a sidewalk or similar pedestrian traffic area such that individuals may simply order food product without having to leave the sidewalk. Beneficially, the self-contained food stand should permit all interactions with customers to be handled locally at the food stand.

SUMMARY

Accordingly, one embodiment of the present invention comprises a self-contained slushy stand built proximate to a sidewalk allowing pedestrian customers passing by to order, pay and receive a slushy (with alcohol if preferred) of their choosing. In one embodiment, the stand comprises broadly (i) a service area including one or more cabinet units with countertops, sinks and refrigerated storage, said service area configured for employees to work therein; (ii) a storage unit rear of said service area, said storage unit configured to retain at least raw slushy product, one or more condenser units and slushy machines, said storage unit including an access door permitting personnel to access one or more of said raw slushy product, condenser units and slushy machines; (iii) payment receiving device; (iv) power source; and (iv) water source. In another embodiment, the self-contained slushy stand also includes a canopy, speakers, cameras, heaters, misters and/or signage.

It is envisioned that the slushy stand detailed herein may be built near busy areas, such as The Strip in Las Vegas or Miami Beach, such that the pedestrian traffic may take advantage of the easy and convenient stand to purchase a desirable product without leaving the sidewalk area.

While a slushy stand is detailed herein, it is recognized that other products, such as ice cream, sodas and other liquor-based drinks may be sold in a similar stand.

Other variations, embodiments and features of the present invention will become evident from the following detailed description, drawings and claims.

DETAILED DESCRIPTION

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

FIGS. 1-5 show individual views of a slushy stand 100 according to the embodiments of the present invention. The slushy stand 100 includes a service area 110 and storage unit or shell 115 fabricated proximate a sidewalk or similar thoroughfare. More specifically, service area 110 permits face-to-face interaction between slushy stand personnel and potential customers passing by along said sidewalk. As also shown in FIGS. 9A-9D, the service area 110 is defined by an outer wall 109 and a front wall of the storage unit 115. The service area 115 contains a series of cabinets 120 running along a front service area and retail display 121 and rear order preparation area 122. The cabinets 120 may include one or more refrigerated storage areas 119, counter tops 123 and sinks 124 allowing staff to prepare product and store necessary items. The rear order preparation area 122 is proximate the storage unit 115 which has a wall serving as a back wall of the slushy stand 100. A break 101 in the outer wall 109 at one end of the service area 110 permits staff to enter and exit the service area 110. A swinging gate 102 allows the break 101 to be opened and closed as needed. Additional breaks may be utilized.

Figure 9A:
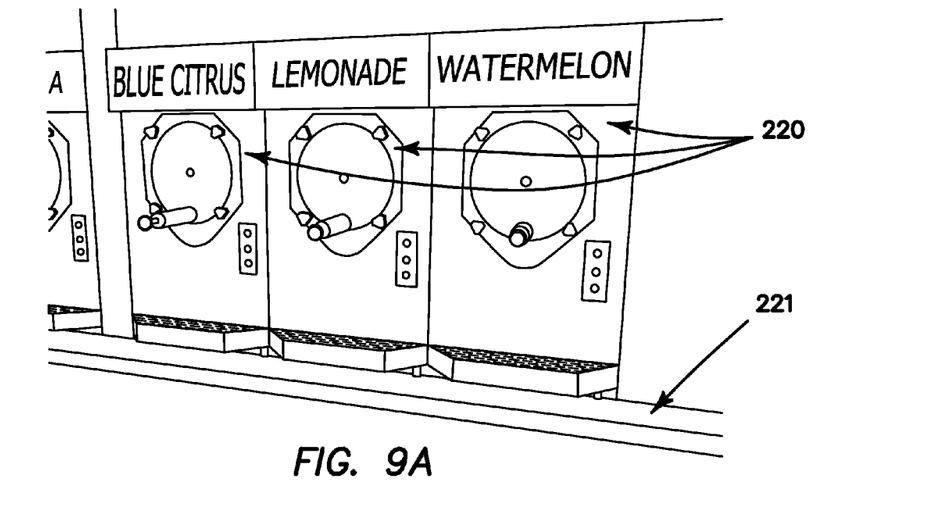
FIGS. 9A-9E illustrate various views of a slushy stand service area according to the embodiments of the present invention.
Figure 9B:
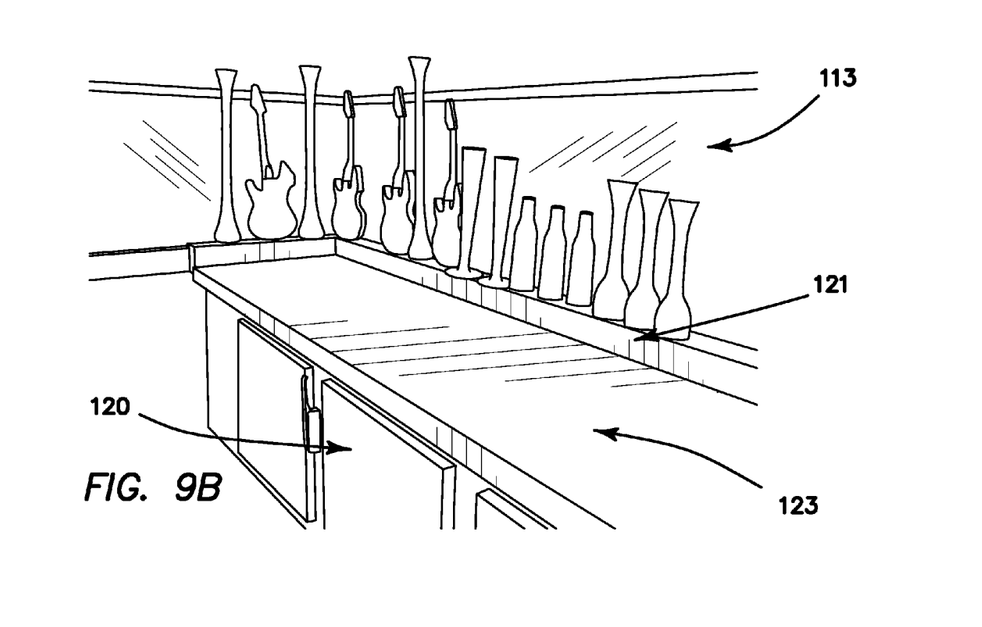
Figure 9C:
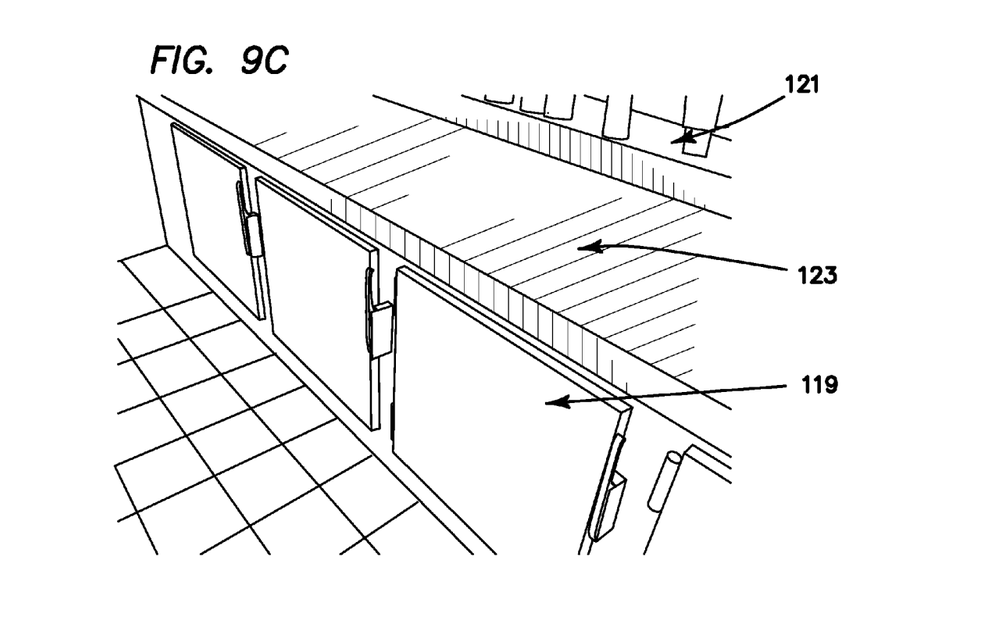
Figure 9D:
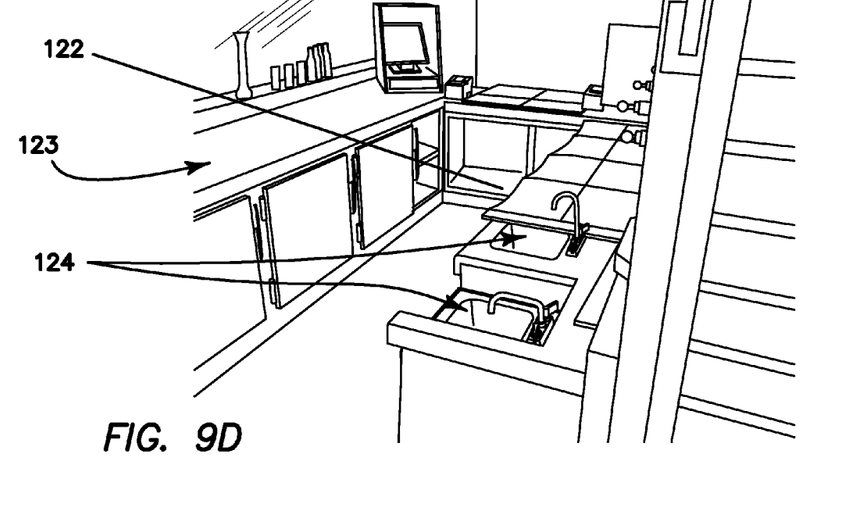
Figure 9E:
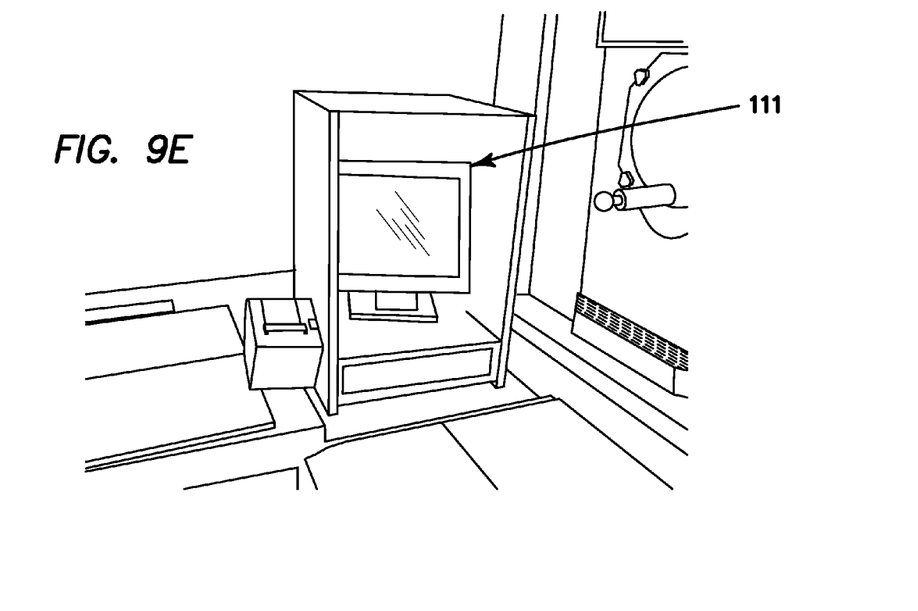

As shown in FIG. 9E, the service area 110 includes a point-of-sale device, such as a touch screen cash register 111 allowing staff personnel to receive payment for the slushy being sold. A transaction opening in a transparent facade 113 extending upward from said wall 109 and substantially surrounding the service area 110 allows interactions (e.g., ordering and payment) between personnel and pedestrian customers/passersby.

Figure 1:
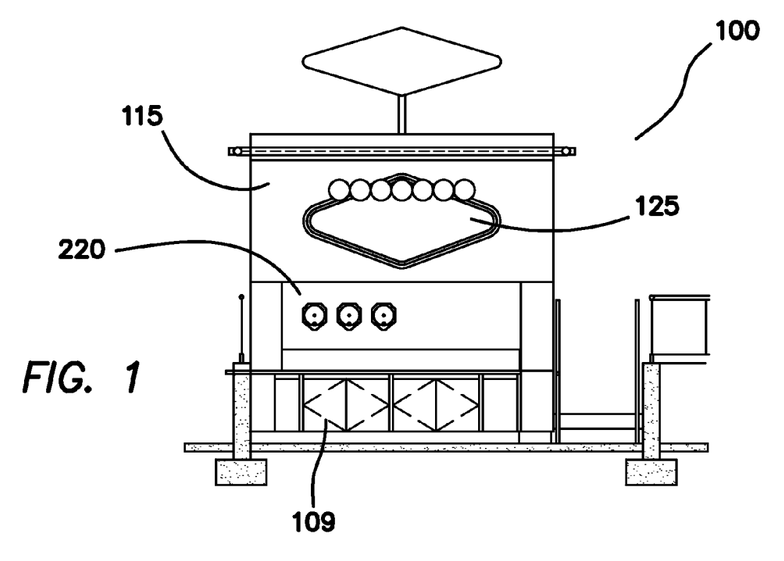
FIG. 1 illustrates a front view of a slushy stand according to the embodiments of the present invention.
Figure 2:
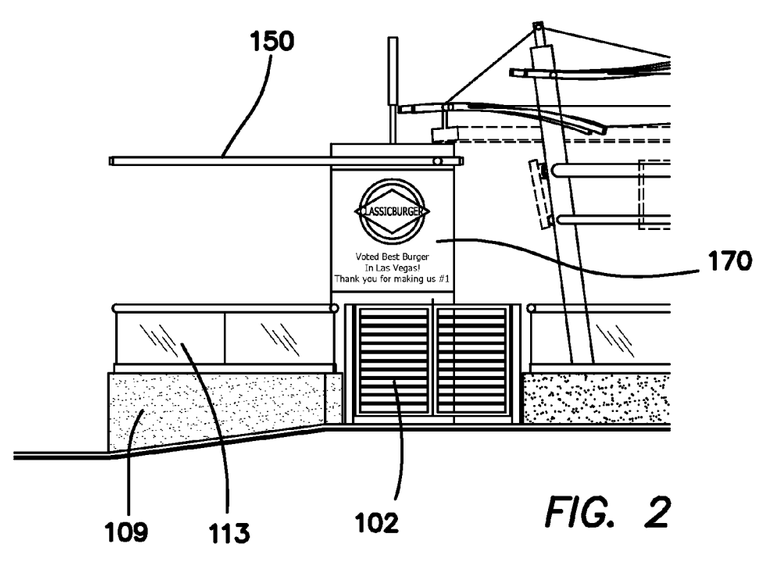
FIG. 2 illustrates a side view of a slushy stand according to the embodiments of the present invention.
Figure 5:
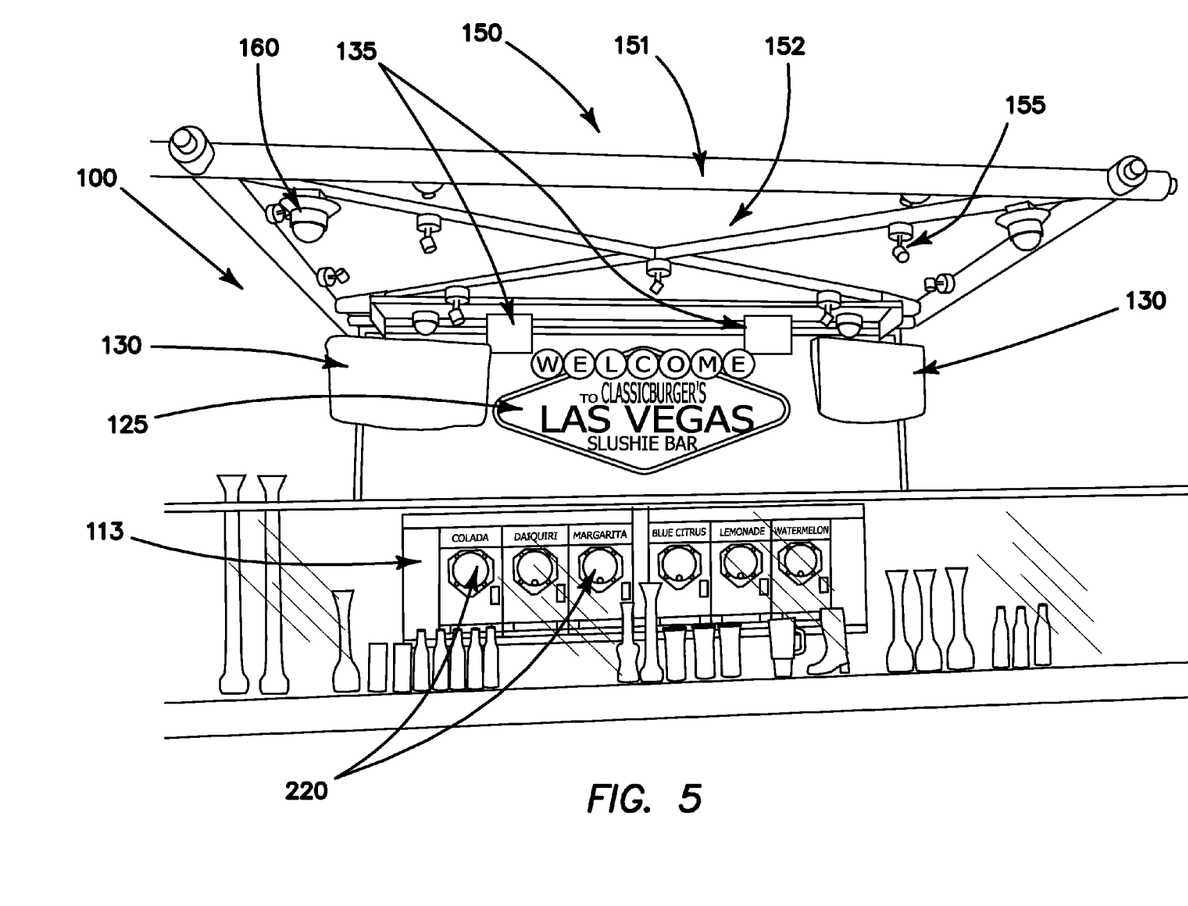
FIG. 5 illustrates a front view of the slushy stand with signage and canopy according to the embodiments of the present invention.
Figure 6:
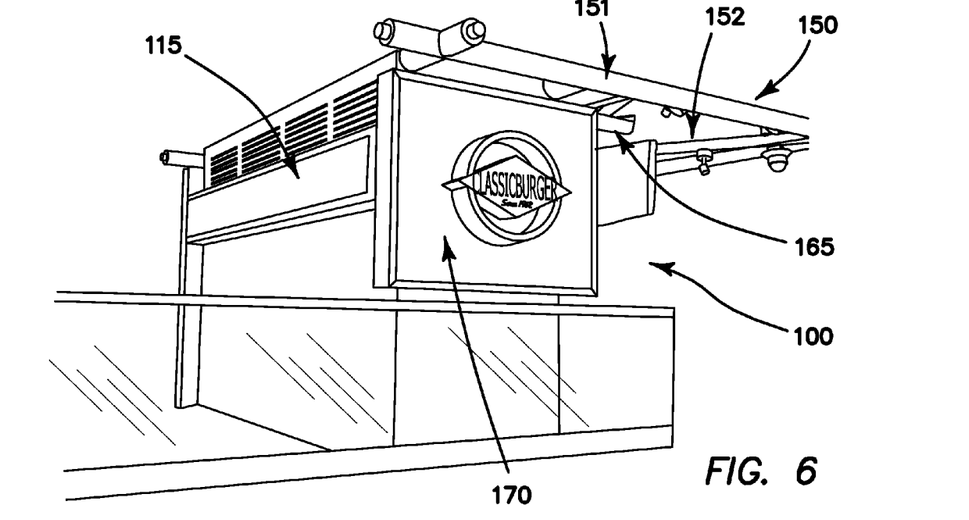
FIG. 6 illustrates a perspective side view of the slushy stand according to the embodiments of the present invention.
Figure 7:
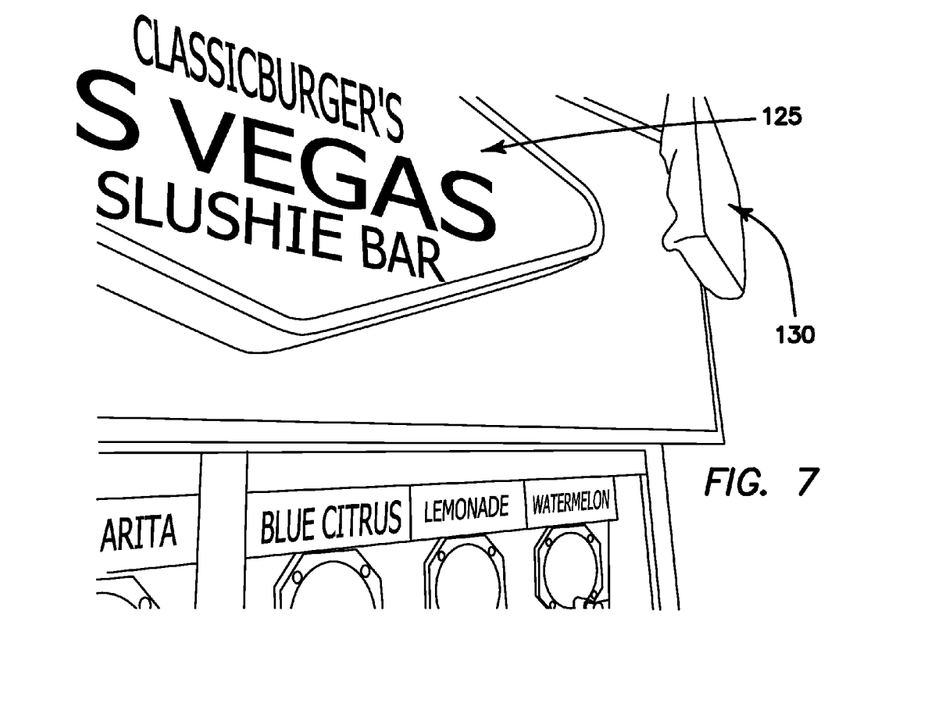
FIG. 7 illustrates a close up front view of signage and slushy machines according to the embodiments of the present invention.
Figure 8:
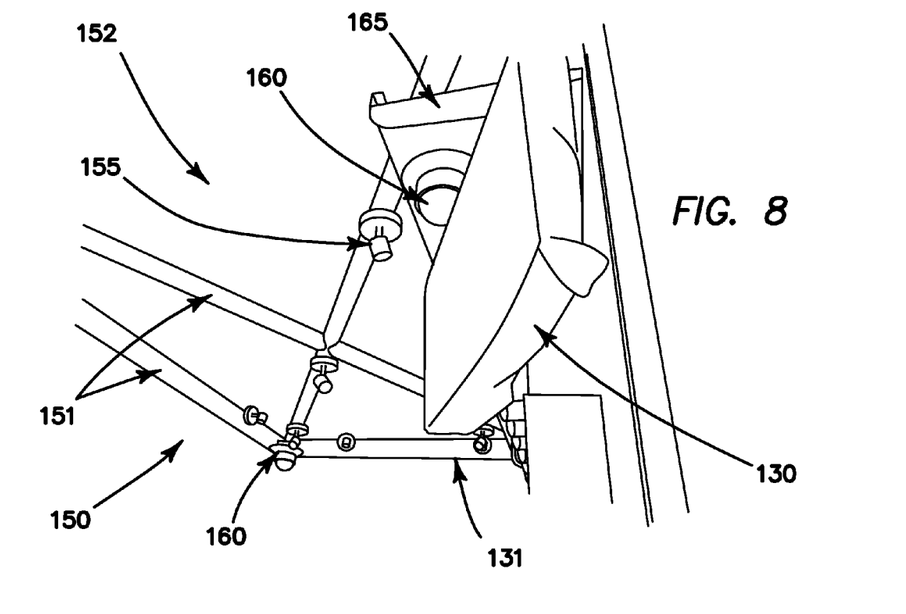
FIG. 8 illustrates an underside view of an optional canopy according to the embodiments of the present invention.

As shown best in FIGS. 1, 5 and 7, a front wall of the storage unit 115 supports signage 125, flat screen monitors/televisions 130 and speakers 135. The signage 125 may of a back lit type or video based. As shown in FIGS. 5, 6 and 8, a canopy 150 is positioned to cover the service area 110 and further support lights 155 and security cameras 160. The canopy 150, as shown, includes a frame 151 with an attached weather-resistant fabric sheet 152 acting to block the elements such as sunlight and precipitation. As shown, the frame 151 has a square-shaped perimeter and a pair of cross-members although any frame shape and design is conceivable. The frame 151 may be supported in part by the storage unit 115 or include support members extending through a portion of the storage unit 115. Alternatively, the canopy 150 may be self-supported. A misting system 131 is attached to the frame 151 and/or the fabric sheet 152. While not shown, overhead fans may be supported by the canopy 150 as well. In one embodiment, air conditioning and heat may be directed into the service area 115. Drapes or sunshades may be used between the canopy 150 and façade 113 to create a partially sealed area to contain the cooled and heated air.

Figure 10A:
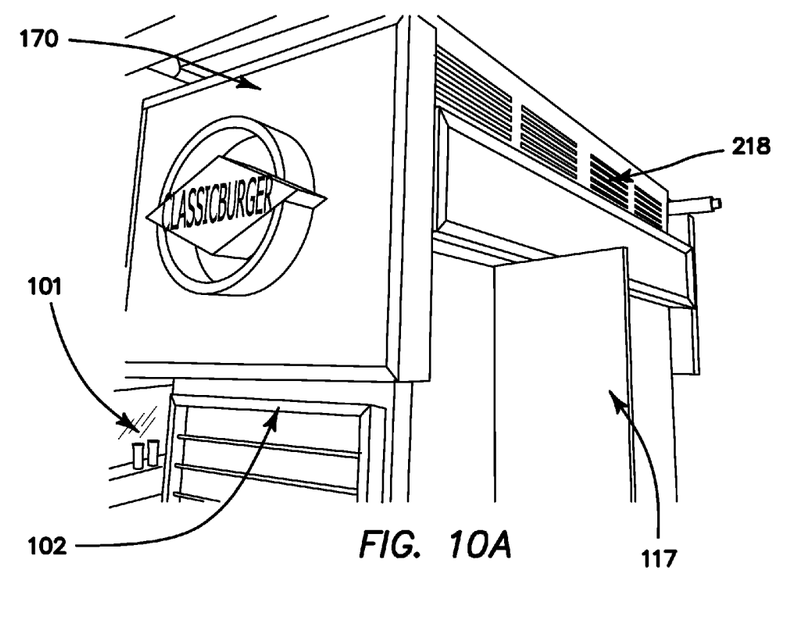
FIGS. 10A-10D illustrate various views of a slushy stand storage unit according to the embodiments of the present invention.

An overhang 165 extending from said storage unit 115 beneath said canopy 150 further provides means to support security cameras 160 and other articles as needed. The overhang 165 may also serve to support the frame 151. As shown in FIGS. 6 and 10A, the storage unit 115 may also support signage 170 on sides thereof. Such signage 170, along with music disseminated via said speakers 135 helps attract pedestrian customers.

Figure 3:
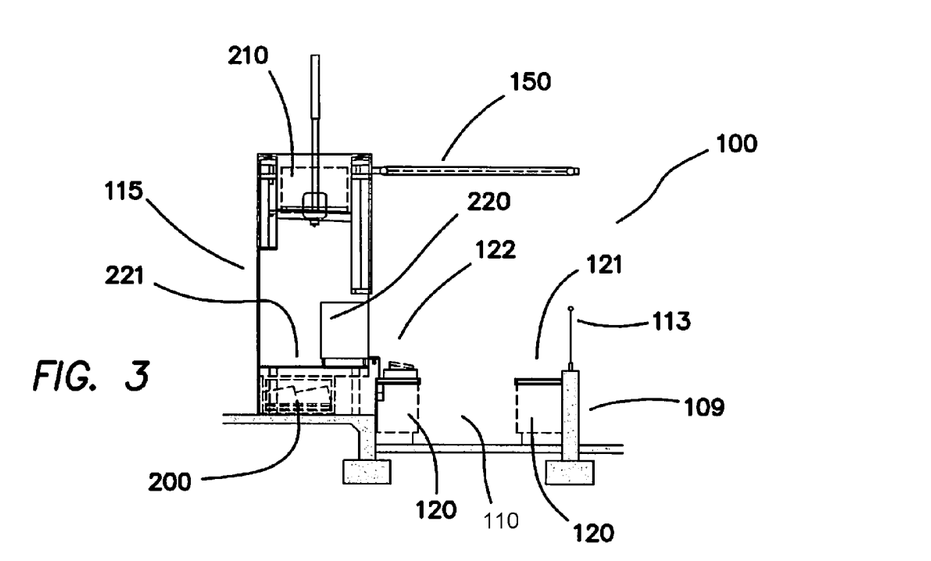
FIG. 3 illustrates a side view (showing internal features) of a slushy stand according to the embodiments of the present invention.
Figure 4:
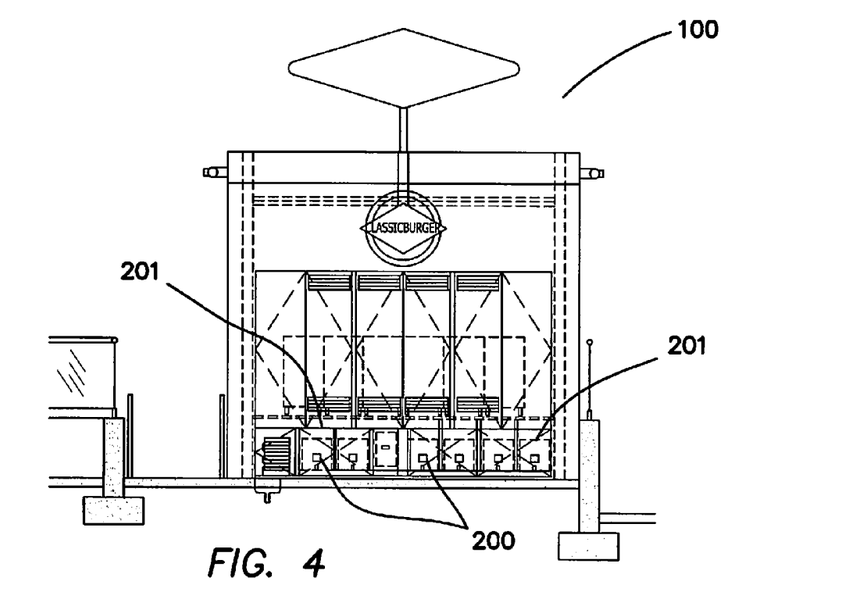
FIG. 4 illustrates a rear view (showing internal features) of the slushy stand according to the embodiments of the present invention.

The walk-in storage unit 115 contains at least raw slushy product 200, condensers 210 and slushy machines 220. A door 117 provides access to the interior of the storage unit 115 including mechanical and electrical features of the slushy stand 100. FIG. 3 shows the one or more condensers 210, and associated components such as compressors, contained in a top portion of the storage unit 115. The condensers 210 may be accessed and serviced via a roof of the storage unit 115. The condensers 210, and associated components, serve to maintain the slushy product 200 in the slushy machines 220 in a semi-frozen state. In one embodiment, the slushy stand 100 has three condensers 210 and six slushy machines 220. Those skilled in the art will recognize that more or less than three condensers 210 and six slushy machines 220 may be used. Refrigeration lines run from the condensers 210 to the slushy machines 220. Vents 218 in the storage unit 115 provide exit outlets for heat and exhaust generated by the one or more condensers 210 and associated components. The storage unit 115 also houses electrical boxes, water pipes, power conduits and such components which may be inspected and serviced by personnel entering the storage unit 115. Product inventory may also be stored in the storage unit 115. The slushy machines 220 may also be accessed from within the storage unit 115.

Figure 11A:
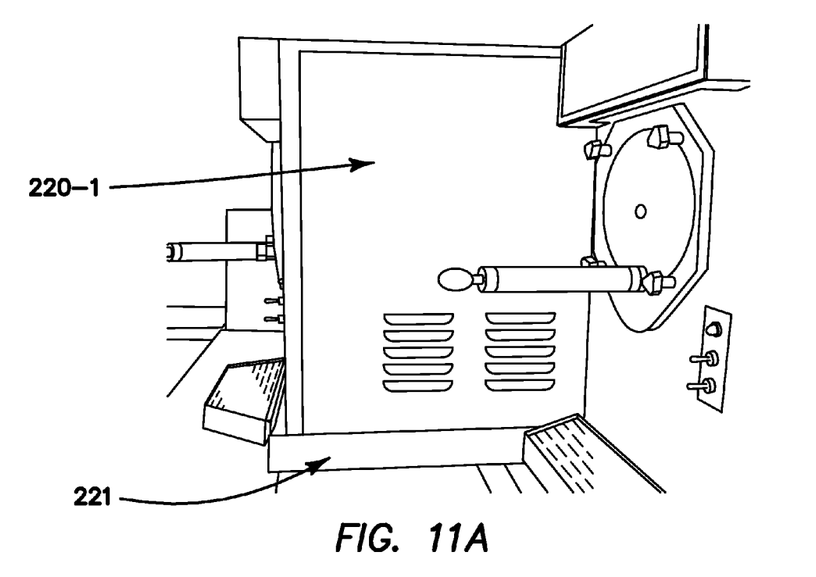
FIGS. 11A-11C illustrate various views of a slide out mechanism supporting slushy machines according to the embodiments of the present invention.
Figure 11B:
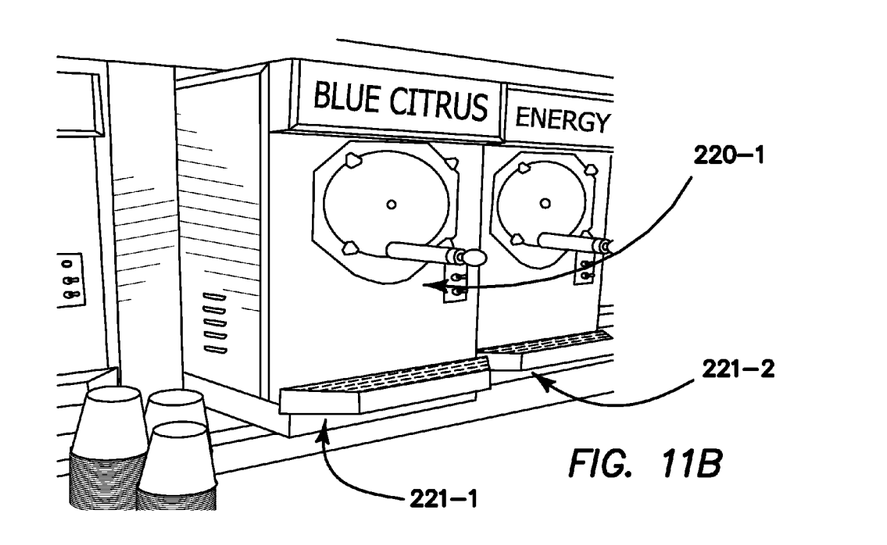
Figure 11C:
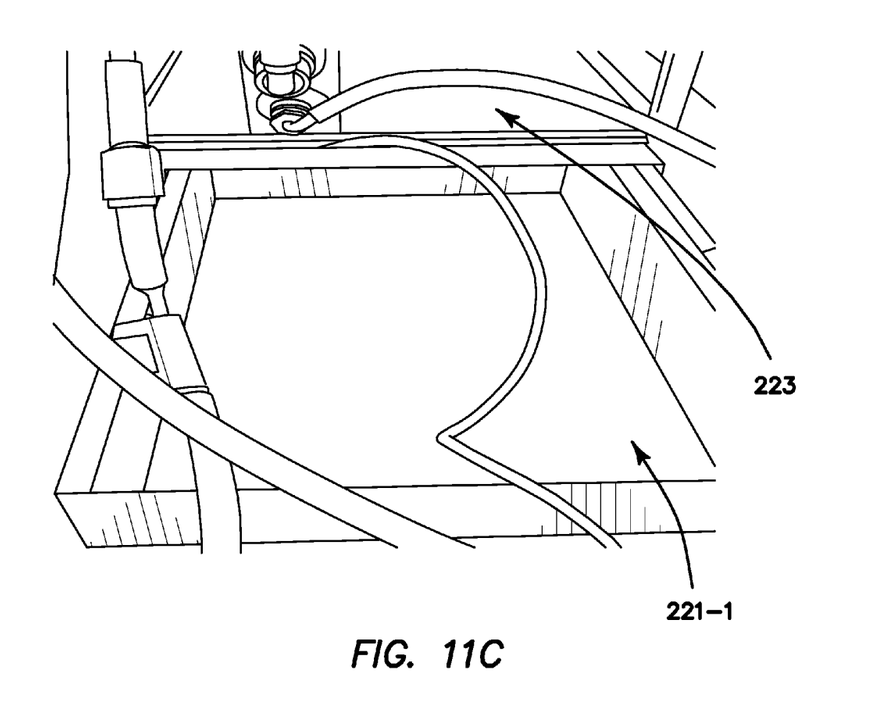

As shown in FIG. 9A and FIGS. 11A-11C, the slushy machines 220 are positioned on a pull-out shelf 221 within the storage unit 115. In this manner, shelf 221 may be used to access the slushy machines 220 from the front of the storage unit 115. FIGS. 11A and 11B shows a slushy machine 220-1 pulled out using the shelf 221. As shown, in one embodiment, the pull-out shelf comprises multiple sections 221-1, 222-2 which each support a single slushy machine 220. FIG. 11C shows a shelf 221-1 with the slushy machine 220 removed. The shelf 221-1 slides in and out of a sleeve 223, channel or similar mechanism within the storage unit 115. Wheels, bearings or similar articles facilitate the rolling function of the shelf 221-1 within the sleeve 223.

An opening in the front of the storage unit 115 receives the serving side of the slushy machines 220. A drip drain may receive overflow product from the slushy machines 220. A cabinet 120 running along the rear order preparation area 122 provides a counter-top surface proximate the slushy machines 220 for personnel to prepare a slushy.

Figure 10B:
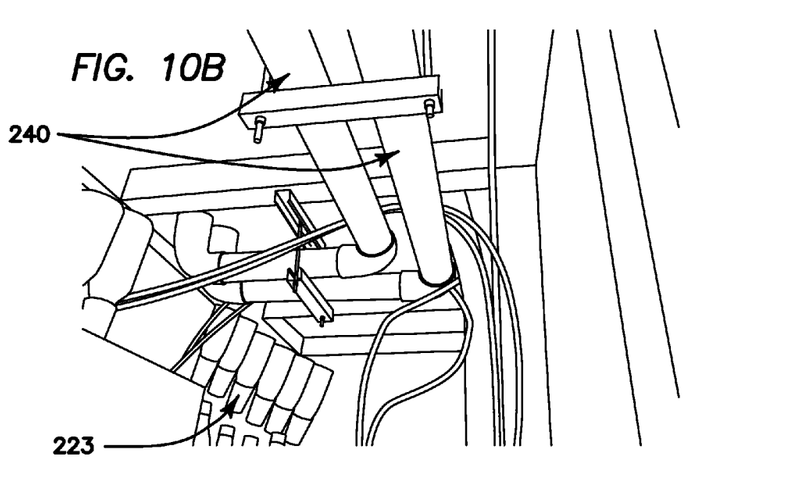
Figure 10C:
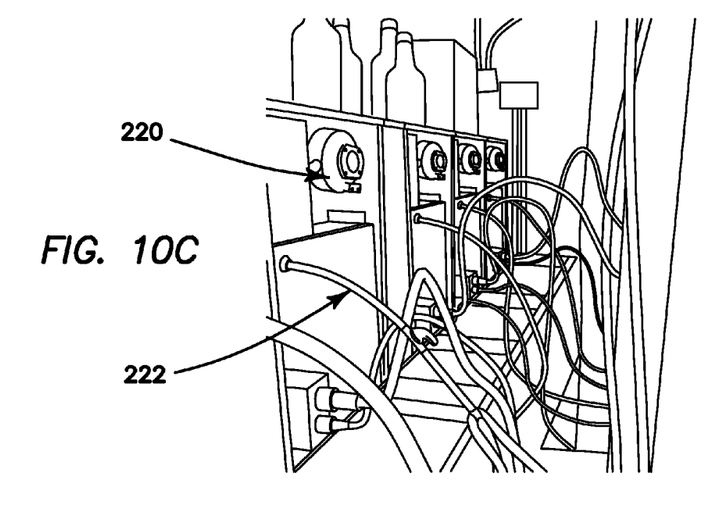
Figure 10D:
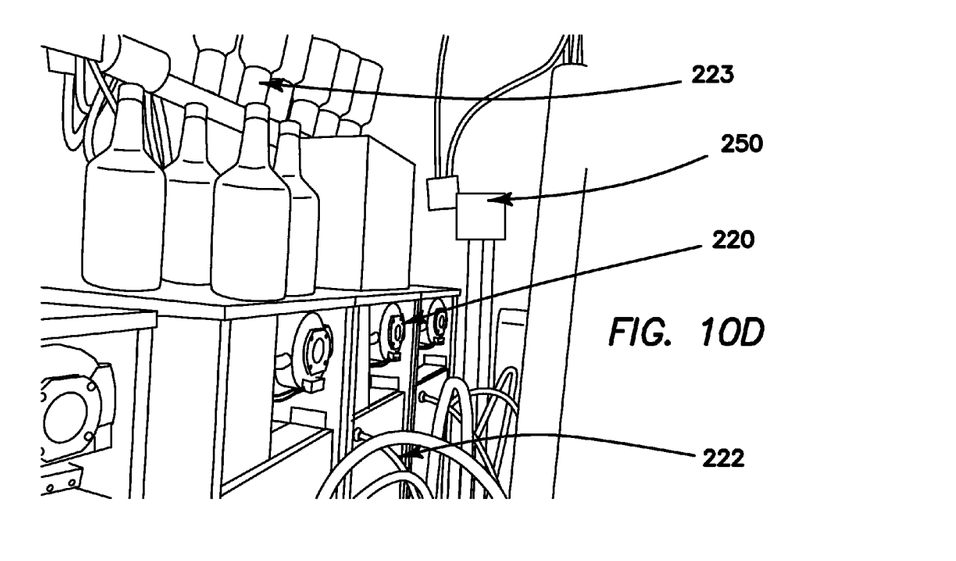

As shown in FIGS. 10C and 10D, the raw slushy product 200 connects to the individual slushy machines 220 via tubing 222 within the storage unit 115. In one embodiment, the raw slushy product 200 is stored, by flavor, in individual slide-out drawers 201 accessible through a rear of the storage unit 115. Alcohol dispensers 223 provide alcohol content to the slushy machines 220. A width of the storage unit 115 is such that a path allows personnel to comfortably enter the storage unit 115 to change liquor bottles, service the slushy machines and otherwise maintain the contents of the storage unit 115.

Plumbing 240 directs clean, cold and hot water to the slushy stand 100 and removes waste water from the slushy stand 100 via floor, wall, drain and sink clean outs. As shown in FIG. 10B, the plumbing 240 runs through an upper portion of the storage unit 115 into the service area 110. Electrical power 250 is also run to the slushy stand 100 from a nearby source.

Another embodiment includes a local generator and water supply thereby creating a complete self-contained slushy stand. Such a slushy stand may be placed on a trailer or similar transport rendering the slushy stand mobile.

Although the invention has been described in detail with reference to several embodiments, additional variations and modifications exist within the scope and spirit of the invention as described and defined in the following claims.

I claim:

1. A fixed-position slushy stand comprising:
 a service area including one or more cabinet units with countertops, sinks and refrigerated storage with the service area configured for employees to work therein;
 a walk-in, enclosed storage unit rear of, and separate from, the service area with the storage unit configured to retain at least raw slushy product, one or more condenser units and a plurality of slushy machines positioned substantially side-by-side, said storage unit including an access door permitting personnel to walk into said storage unit to at least service said raw slushy product and said plurality of slushy machines, wherein a wall of said storage unit serves as a back wall of said service area, said storage unit supporting one or more condensers which are accessible via a roof of said storage unit, said plurality of slushy machines each supported by a slide out shelf slidable between said storage unit and said service area permitting service access to each of said slushy machines within the service area once a subject one of said plurality of slushy machines is slid out from said storage unit into said service area;
 payment receiving device;
 power source; and
 water source.

2. The slushy stand of claim 1 wherein said power source is remote from said service area.

3. The slushy stand of claim 1 wherein said water source is remote from said service area.

4. The slushy stand of claim 1 wherein said power source is a generator local relative to said service area.

5. The slushy stand of claim 1 wherein said water source is local relative to said service area.

6. The slushy stand of claim 1 wherein said one or more condenser units are positioned at a top of said storage unit.

7. The slushy stand of claim 1 further comprising a canopy covering said service area.

8. The slushy stand of claim 1 further comprising a transparent facade atop said wall, said transparent facade having one or more openings for interaction between pedestrian customers and slushy stand personnel.

9. A fixed-position slushy stand comprising:
- a service area including one or more cabinet units with countertops, sinks and refrigerated storage with the service area configured for employees to work therein;
- a walk-in, enclosed storage unit rear of, and separate from, the service area with the storage unit configured to retain at least raw slushy product, one or more condenser units and a plurality of slushy machines positioned substantially side-by-side, said storage unit including an access door permitting personnel to walk into said storage unit to and service said raw slushy product and said plurality of slushy machines, wherein a wall of said storage unit serves as a back wall of said service area, said storage unit supporting one or more condensers which are accessible via a roof of said storage unit, said plurality of slushy machines each supported by a slide out shelf slidable between said storage unit and service unit permitting service access to said plurality of slushy machines within the service area once a subject one of said plurality of slushy machines is slid out from said storage unit into said service area;
- a canopy covering said service area;
- payment receiving device;
- power source; and
- water source.

10. The slushy stand of claim 9 wherein said power source is remote from said service area.

11. The slushy stand of claim 9 wherein said water source is remote from said service area.

12. The slushy stand of claim 9 wherein said power source is a generator local relative to said service area.

13. The slushy stand of claim 9 wherein said water source is local relative to said service area.

14. The slushy stand of claim 9 wherein said one or more condenser units are positioned at a top of said storage unit.

15. The slushy stand of claim 9 further comprising a transparent facade atop said wall, said transparent facade having one or more openings for interaction between pedestrian customers and slushy stand personnel.

16. A fixed-position slushy stand comprising:
- a service area including one or more cabinet units with countertops, sinks and refrigerated storage with the service area configured for employees to work therein;
- a walk-in, enclosed storage unit rear of, and separate from, the service area with the storage unit configured to retain at least raw slushy product, one or more condenser units and a plurality of slushy machines positioned substantially side-by-side, said storage unit including an access door permitting personnel to walk into said storage unit to service said raw slushy product and said plurality of slushy machines, wherein a wall of said storage unit serves as a back wall of said service area, said storage unit supporting one or more condensers which are accessible via a roof of said storage unit, said storage unit comprising a series of slide out shelves slidable between said storage unit to said service area and supporting said plurality of slushy machines such that said plurality of slushy machines may each be accessed for service within the service area once a subject one of said slushy machines is slid out from said storage unit into said service area;
- payment receiving device;
- power source; and
- water source.

17. A fixed-position slushy stand comprising:
- a service area including one or more cabinet units with countertops, sinks and refrigerated storage with the service area configured for employees to work therein;
- a walk-in, enclosed storage unit rear of, and separate from, the service area with the storage unit configured to retain at least raw slushy product, one or more condenser units and a plurality of slushy machines, said storage unit including an access door permitting personnel to walk into said storage unit to at least service said raw slushy product and said plurality of slushy machines, wherein a wall of said storage unit serves as a back wall of said service area, said storage unit supporting one or more condensers which are accessible via a roof of said storage unit;
- one or more slidable shelves each supporting one of said plurality of slushy machines, said one or more shelves slidable between said storage unit and said service area such that said plurality of slushy machines may be accessed for service in said storage unit and service area once a subject one of said plurality of slushy machines is slid out from said storage unit into said service area;
- payment receiving device;
- power source; and
- water source.

* * * * *